(12) United States Patent
Steinhilber

(10) Patent No.: US 7,639,573 B2
(45) Date of Patent: Dec. 29, 2009

(54) DEVICE FOR HANDLING DATA MEDIA IN A STORAGE DEVICE

(75) Inventor: Friedhelm Steinhilber, Rottweil (DE)

(73) Assignee: BDT AG, Rottweil (DE)

( * ) Notice: Subject to any disclaimer, the term of this patent is extended or adjusted under 35 U.S.C. 154(b) by 439 days.

(21) Appl. No.: 11/565,980

(22) Filed: Dec. 1, 2006

(65) Prior Publication Data

US 2007/0159715 A1    Jul. 12, 2007

(30) Foreign Application Priority Data

Dec. 1, 2005   (DE) ................. 10 2005 057 673

(51) Int. Cl.
*G11B 21/08*   (2006.01)
*G11B 7/085*   (2006.01)
(52) U.S. Cl. ................. 369/30.45; 369/30.57
(58) Field of Classification Search ........... 720/600, 720/601, 632; 360/98.04–6; 369/30.43, 369/30.45, 30.51, 30.55, 30.57; 414/266, 414/277, 281
See application file for complete search history.

(56) References Cited

U.S. PATENT DOCUMENTS

| | | | | |
|---|---|---|---|---|
| 5,485,436 | A | * 1/1996 | Forget et al. | 369/30.52 |
| 6,496,325 | B1 | 12/2002 | Kersey et al. | 360/92 |
| 6,570,735 | B2 | * 5/2003 | Coffin et al. | 360/92.1 |
| 6,754,037 | B1 | * 6/2004 | Ostwald et al. | 360/92.1 |

FOREIGN PATENT DOCUMENTS

DE       60010023 T2      1/2005

* cited by examiner

*Primary Examiner*—Andrea L Wellington
*Assistant Examiner*—Gustavo Polo
(74) *Attorney, Agent, or Firm*—King & Spalding L.L.P.

(57) ABSTRACT

A robotic unit with a picker (18) serves for handling data media in a storage device. The robotic unit can be traversed with a base plate (24) on a guide bar (16). On the base plate (24) a rotary plate (28) is disposed which can be turned about a vertical axis. On the rotary plate (28) two motors (52, 56) are disposed, each of which causes, via a toothed wheel drive, the translational and the turning movement of the robotic unit. The toothed wheel drives (48, 50, 54, 58) are disposed in a common plane in an indented recess (46) of the base plate (24).

12 Claims, 7 Drawing Sheets

DEVICE FOR HANDLING DATA MEDIA IN A STORAGE DEVICE

RELATED APPLICATION

This application claims priority from German Patent Application No. DE 10 2005 057 673.7, which was filed on Dec. 1, 2005, and is incorporated herein by reference in its entirety.

TECHNICAL FIELD

The invention relates to a device for handling data media in a storage device according to the preamble of claim 1.

BACKGROUND

In order to store large amounts of data in data processing, the data are recorded on data media, e.g., on magnetic tape cartridges, magnetic disks, CDs, or DVDs. In order to store a greater number of such data media and to be able to access them, storage devices are used which are designated as a library or autoloader. In these storage devices a greater number of data media are accommodated in corresponding slots and can be taken from or inserted into the respective slots by means of a robotic unit. In this way, the data media are dispensed selectively or transported to a functional unit disposed in the device, e.g., a drive, or, conversely, stored once again in a selected slot.

From U.S. Pat. No. 6,754,037 B1 it is known practice, for handling data media, to traverse a robotic unit, which comprises a picker for the data media, linearly to in front of the slots for the data media. The picker can be turned about an axis of rotation perpendicular to the plane of the linear traverse path in order to align the picker to slots disposed on both sides of the traverse path and a functional unit disposed at the end of the traverse path. For this purpose, a carriage can be traversed on a linear guide, where a rotary table, which carries the picker, is attached to the carriage. Since the linear carriage and the rotary table are arranged one on the other, a height of the movement mechanism of the robotic unit follows and determines the minimum distance of the picker above the floor of the storage unit. This distance is not available for the disposition of slots for the data media.

From U.S. Pat. No. 6,496,325 B1 a device according of the preamble of claim 1 is known. In this device the robotic unit can be traversed, guided by means of a toothed linear track, to in front of the slots for the data media. In order to be able to turn the robotic unit about its vertical axis of rotation, the toothed linear track is split. A part of the toothed track sits on a toothed wheel which can be turned about the vertical axis of rotation and can thus be turned by means of a motor driving this toothed wheel in such a manner that it turns. Also there, the toothed wheel sits in a plane under the toothed linear track so that also there the problem of height presents itself. Furthermore, the robotic unit can only be turned in a partial area of the traversing path and thus for turning must first always be traversed into this partial area.

SUMMARY

The invention is based on the object of providing a device for handling data media in a storage device, in which device the translational and turning drive mechanism of the robotic unit has as small a height as possible.

A device for handling data media in a storage device may comprise slots for the data media, wherein the openings of said slots are disposed in the storage device in at least two groups offset at an angle with respect to one another; a robotic unit comprising a base plate which can be displaced in a guided manner along a translational path; a rotary plate carrying the picker and being mounted on the base plate in such a manner that it can turn about an axis of rotation perpendicular to the base plate which comprises, concentric to the axis of rotation, a recess within which a toothed wheel is accommodated which is mounted in such a manner that it can turn and is concentric with the axis of rotation; a first motor disposed on the rotary plate which engages, by means of a first pinion, in an outer toothing of a toothed wheel, wherein the outer toothing of the toothed wheel is in engagement with a toothed linear track, and a second motor disposed on the rotary plate which engages, by means of a second pinion, in a circular toothing of the base plate, wherein said circular toothing is concentric to the toothed wheel.

In an embodiment, the recess of the base plate can be formed to be circular and the circular toothing can be formed as an inner toothing on the circumference of the recess. In an embodiment, the outer toothing of the toothed wheel and the inner toothing of the recess can be in a common plane. In an embodiment, by driving only the first motor the robotic unit can be moved translationally and by driving both the first motor and the second motor turning of the robotic unit about the axis of rotation can be combined with any translational movement of the robotic unit. In an embodiment, the rotary plate may carry a picker which can be adjusted in its height. In an embodiment, the picker can be lowered to the rotary plate.

BRIEF DESCRIPTION OF THE DRAWINGS

The invention is explained below in more detail with the aid of an exemplary embodiment represented in the drawings, in which.

DETAILED DESCRIPTION

Figure 1:
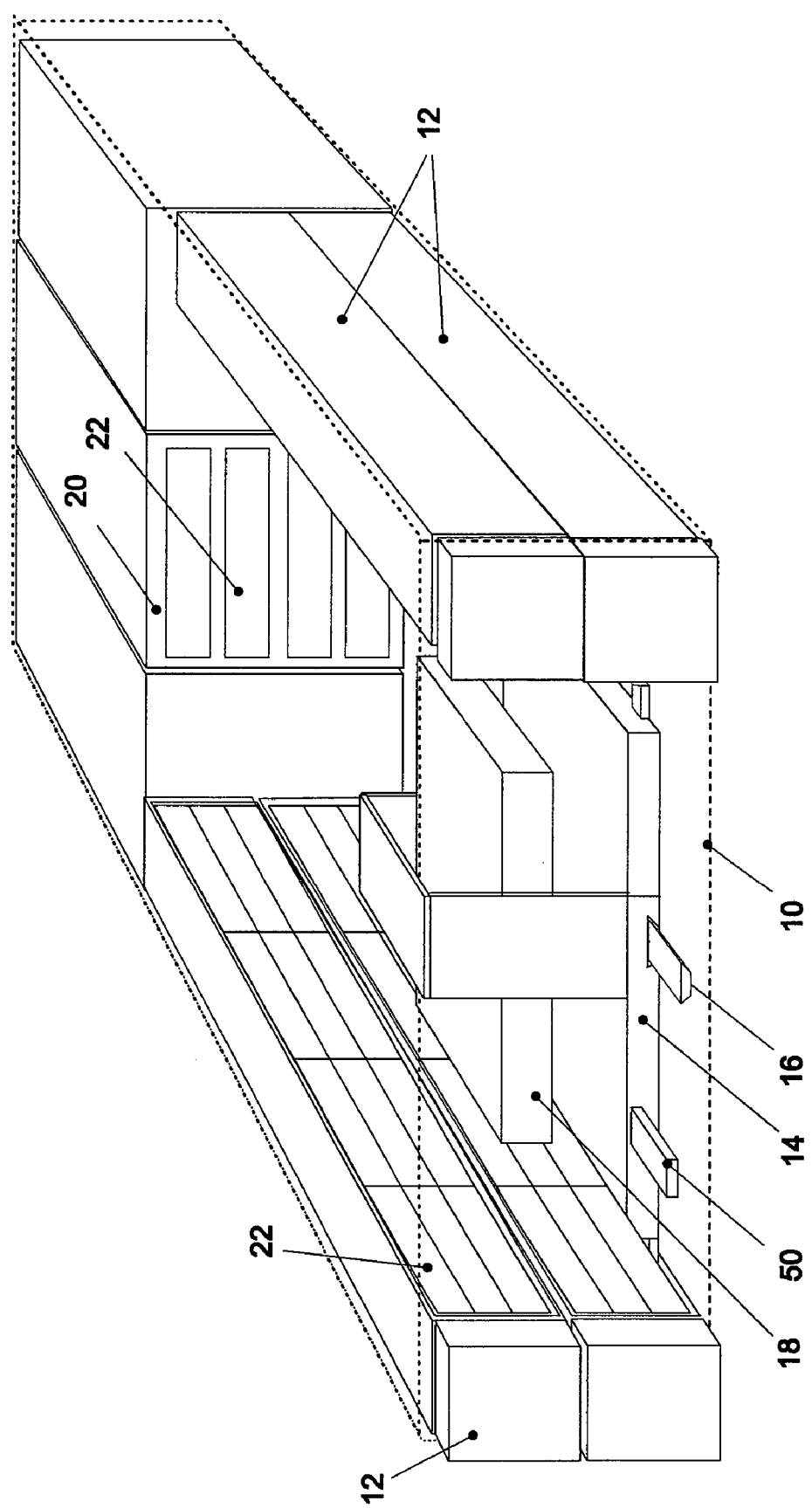
FIG. 1 shows a storage device in schematic perspective view.
Figure 2:
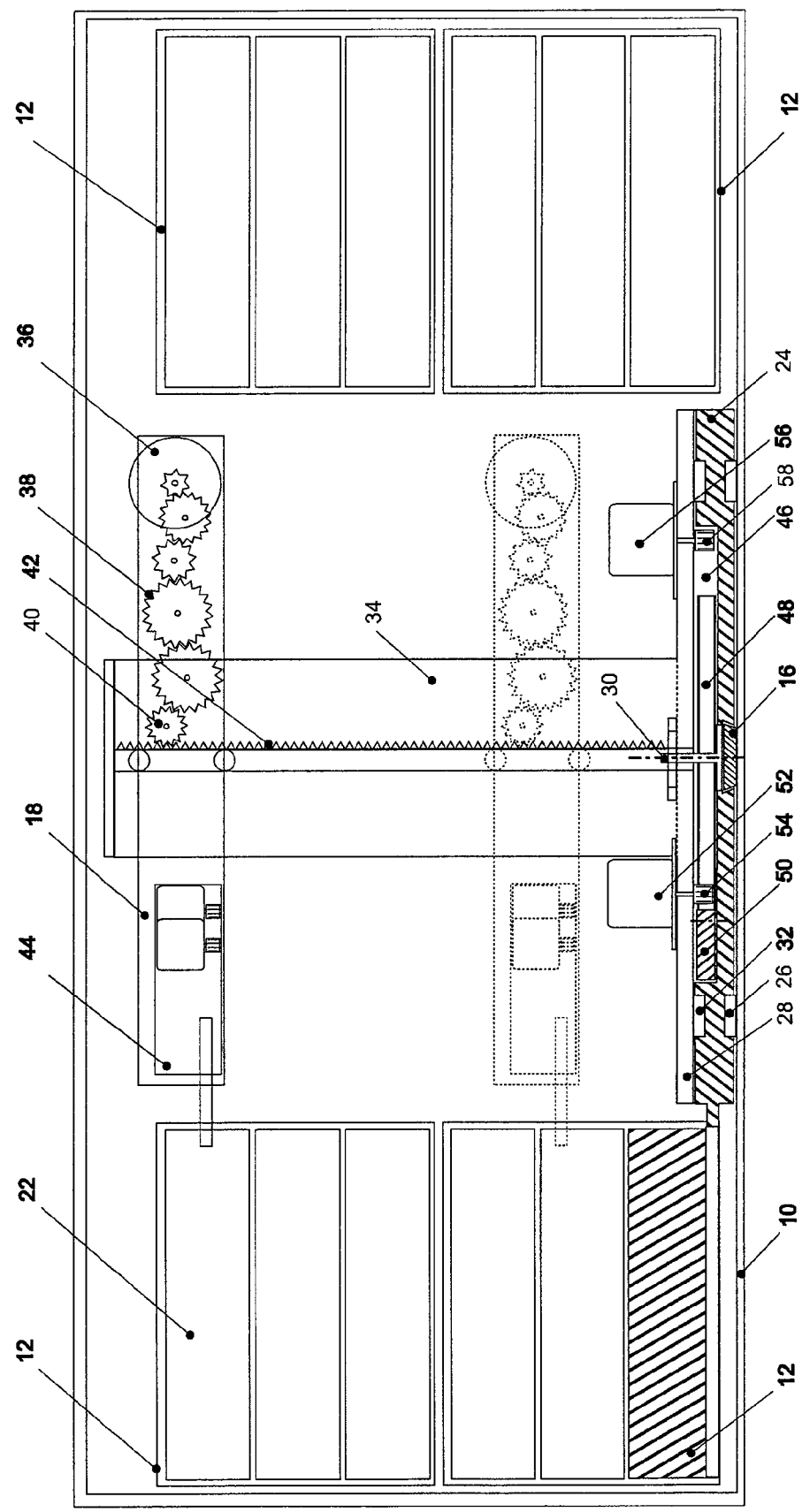
FIG. 2 shows a vertical cross section of the storage device.
Figure 2A:
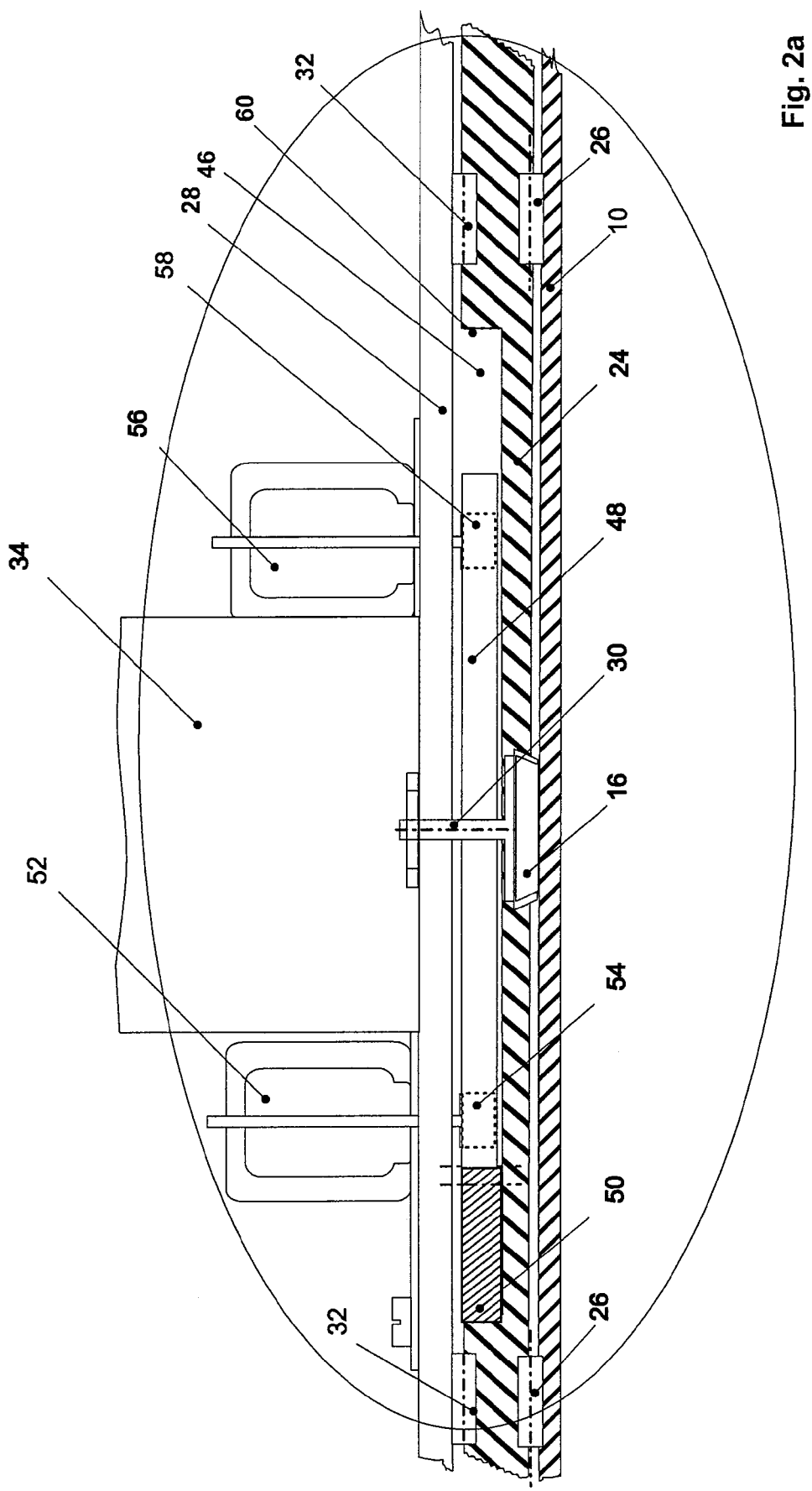
FIG. 2*a* shows an enlarged extract from FIG. 2.

In the device according to an embodiment, the robotic unit with a base plate can be traversed translationally. A rotary plate which carries the picker is disposed directly on this base plate and can be turned with respect to this base plate. The toothed drive mechanism for the translational movement of the base plate and the toothed drive mechanism for the turning movement of the rotary plate with respect to the base plate are integrated into the base plate so that they do not increase the height of the positioning drive mechanism for the robotic unit. For this purpose, a toothed wheel is disposed in a recess concentric to the axis of rotation and is mounted in such a manner that it can turn, where said toothed wheel can be driven be means of a first motor disposed on the rotary plate and where said toothed wheel engages in the toothed linear track for translational advance. A second motor disposed on the rotary plate engages in a circular toothing of the base plate, where said toothing is concentric to the toothed wheel, and can thus cause the turning of the rotary plate, and with it of the picker, with respect to the base plate.

In an embodiment which is particularly simple and radially space-saving, the circular toothing of the base plate is formed as an inner toothing of the circular recess which receives the toothed wheel. If, in addition, the toothed wheel and the inner toothing of the recess are in the same plane, then optimal space saving in height is possible.

If only the first motor is operated, then the toothed wheel is driven and runs on the linear toothed track so that a translational movement of the base plate results. In so doing, the rotary plate with the picker maintains its rotary position.

If the second motor is operated, then it runs with its pinion in the circular toothing of the base plate so that the rotary plate is turned with respect to the base plate. If in this case the first motor also mounted on the rotary plate is not operated, then with its pinion it entrains the toothed wheel in a manner corresponding to the turning of the rotary plate. Due to this, the toothed wheel runs on the toothed linear track and the base plate is also moved translationally. Thus, the two motors are driven interdependently in a controlled manner, on account of which these two motors are preferentially formed as electric stepper motors. If only one translational movement of the robotic unit is required, then only the first motor is driven in order to translationally move the base plate along with the rotary plate disposed thereon. If a turning of the robotic unit is required, then both motors are driven. In so doing, the second motor causes the turning of the rotary plate, and therewith of the picker carried by the rotary plate. The first motor is driven in order to compensate the turning of the toothed wheel so that it stands still when turning of the robotic unit without simultaneous translational advance is required. If a translational advance and a turning of the robotic unit are supposed to take place simultaneously, then the first motor is driven so that the impulsion of the toothed wheel by the turning of the rotary plate and the impulsion of the toothed wheel by the first motor for the desired turning movement of the toothed wheel, and therewith for the desired translational movement of the base plate, are superimposed.

The integration according to an embodiment of the translational advance and the turning movement of the robotic unit are independent of the form of the path of the translational movement. This path can be a straight path or a circular or elliptical path. The toothed linear track and the guide for the base plate are formed to correspond to this form of the path.

The picker can be disposed in such a manner that it is fixed on the rotary plate if the slots for the data media are located in a single plane. In addition, the slots can be disposed horizontally or vertically in reference to the plane of movement of the robotic unit. In many instances of application slots are provided in several planes disposed one over another, in particular when the slots are disposed horizontally in these respective planes. In these instances of application the picker can be adjusted in its height on the rotary plate so that the picker can also be positioned vertically in front of the respective slots.

The storage device represented schematically in FIG. 1 is formed as an autoloader and comprises a housing 10 indicated in FIG. 1 as a dashed line, said housing preferentially being formed as a square and being dimensioned in its width and depth for installation in a standardized rack. The height of the housing 10 is chosen according to the number of data media to be accommodated. In the exemplary embodiment represented, the data media are magnetic tape cartridges held in cassettes.

In the housing 10 magazines 12 are disposed, in the view of the vertical front side as shown in FIG. 1, on the left and on the right. The magazines 12 run perpendicular to the vertical front side of the housing 10, where between the left and right magazines 12 a central free space remains. In this free space a robotic unit 14 is disposed, which can be traversed between the magazines 12 as well as parallel to them. For this purpose, the robotic unit 14 runs on a guide bar 16 which is disposed on the floor of the housing 10 and parallel to the magazines 12.

The robotic unit 14 comprises a picker 18 which can be displaced in a controlled manner in its vertical position.

On the rear side of the housing 10 one or more functional units 20 are disposed, e.g., drives for the data media. The functional units 20 are each disposed on the rear face of the free space between the magazines 12.

The magazines 12 and the functional units 20 each comprise receptacles 22, which are formed as slots, in which the data media cassettes are inserted. The slots 22 are each disposed horizontally so that the data media cassettes are inserted lying flat into the slots 22. The slots 22 are each disposed in the magazines 12 in a matrix in which several slots 22 are disposed one next to another in a horizontal plane and several such horizontal planes are disposed one over another. Likewise, several slots 22 of functional units 20 are disposed one over another. For the purpose of changing the data media cassettes, the receiving openings of the slots 22 each open toward the central free space.

The robotic unit 14 can be traversed on the guide bar 16 and the picker 18 is adjustable in its height in the robotic unit 14 and can be pivoted about a vertical axis of rotation so that the picker 18 can be run up, in a controlled manner, to in front of any chosen slot 22 of the magazines 12 or the functional units 20 in order in each case to remove a data media cassette from the slot 22, or to insert a data media cassette into the slot 22, and to transport the data media cassette from slot 22 to any other slot, as is described in detail below.

The robotic unit 14 comprises a base plate 24, which is preferentially formed so as to be rectangular, lies on the floor of the housing 10 between the magazines 12, and preferentially can be traversed, by means of rollers 26 and without friction, on the floor of the housing 10. The guide bar 16 mounted on the floor of the housing 10 engages in the manner of a dove tail in a floor-side slot of the base plate 24, whereby the base plate 24 can be traversed in a guided manner in the longitudinal direction of the guide bar 16.

A rotary plate 28 lies on the upper side of the base plate 24, where said rotary plate can be turned about a vertical swivel pin 30 which is on the base plate 24 and is perpendicular to the plane of the base plate 24. Rollers 32 mounted in the base plate 24 make possible a frictionless turning of the rotary plate 28 on the base plate 24.

The rotary plate 28 carries on its upper side a vertical frame 34 in which the picker 18 can be adjusted in its height. For this purpose, the picker 18 comprises an electric motor 36 which, via a gear mechanism 38, drives a pinion 40 which engages in a vertical toothed track of the frame 34. The picker 18 is formed with a picker arm 44, which can engage the data media cassettes in order to pull them out of the slots 22 or to push them into these slots 22. Such picker arms are known state of the art and thus do not have to be explained in more detail.

The base plate 24 comprises, on its upper side and under the rotary plate 28, a recess 46 which has the form of an indentation with the form of a circular disk and which is formed so as to be concentric with the swivel pin 30. A toothed wheel 48 is situated in the center of the recess 46 and can be turned freely about the swivel pin 30, both with respect to the base plate 24 and with respect to the rotary plate 28. The diameter of the toothed wheel 48 is less than the inner diameter of the recess 46. The axial thickness of the toothed wheel 48 is in accordance with the required play in the axial depth of the recess 46. A toothed linear track in the form of a toothed bar 50 is disposed in the housing 10 and parallel to the guide bar 16. The toothed bar 50 runs in a slot in the upper side of the base plate 24, where the base plate 24 can be traversed freely with respect to the toothed bar 50. The toothed bar 50 runs in the form of a secant through the recess 46 and in so doing lies tangential to the toothed wheel 48 so that the toothed linear track of the toothed bar 50 is in engagement with the outer toothing of the toothed wheel 48.

On the upper side of the rotary plate 28, to the side of and next to the frame 34, a first motor 52 is mounted, which is formed as an electric stepper motor. The motor 52 drives, via a step-down gear unit formed as a flat gear plate, a drive shaft which is guided through the rotary plate 28 and, with a pinion 54, is in engagement with the outer toothing of the toothed wheel 48. Furthermore, a second motor 56 is mounted on the upper side of the rotary plate 28 and near the frame 34, said second motor also being formed as an electric stepper motor. The second motor 56 also drives, via a flat step-down gear unit, a drive shaft which is guided through the rotary plate 28 and, via a pinion 58, is in engagement with a circular toothing which is formed as an inner toothing 60 on the circumference of the recess 46. The motors 52 and 56 are, for translational and turning movement of the robotic unit 14, driven as is explained below with the aid of FIGS. 3 to 6.

Figure 3:
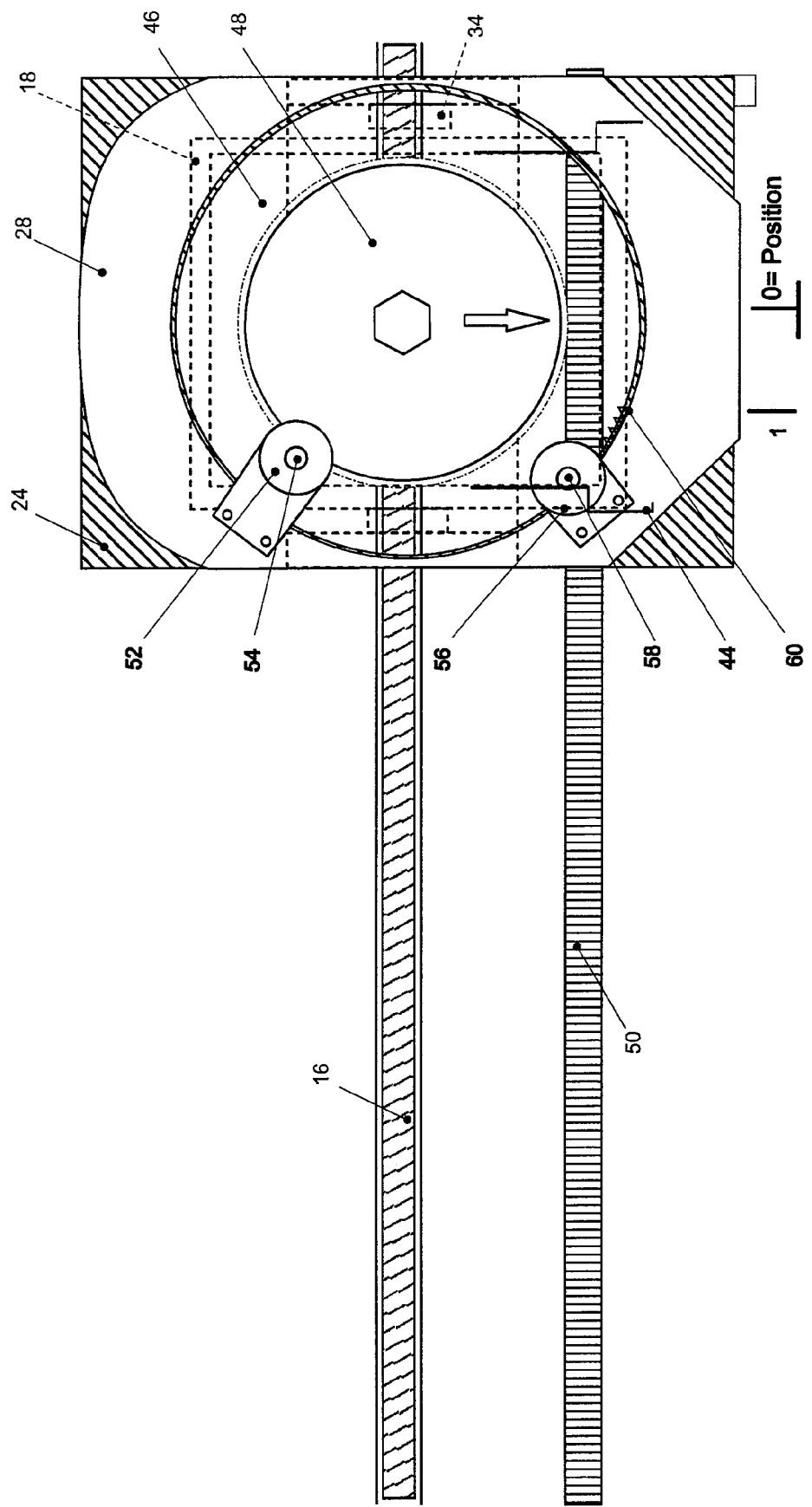
FIGS. 3 to 6 show a schematic top view of the handling device of the storage device in various functional positions.
Figure 4:
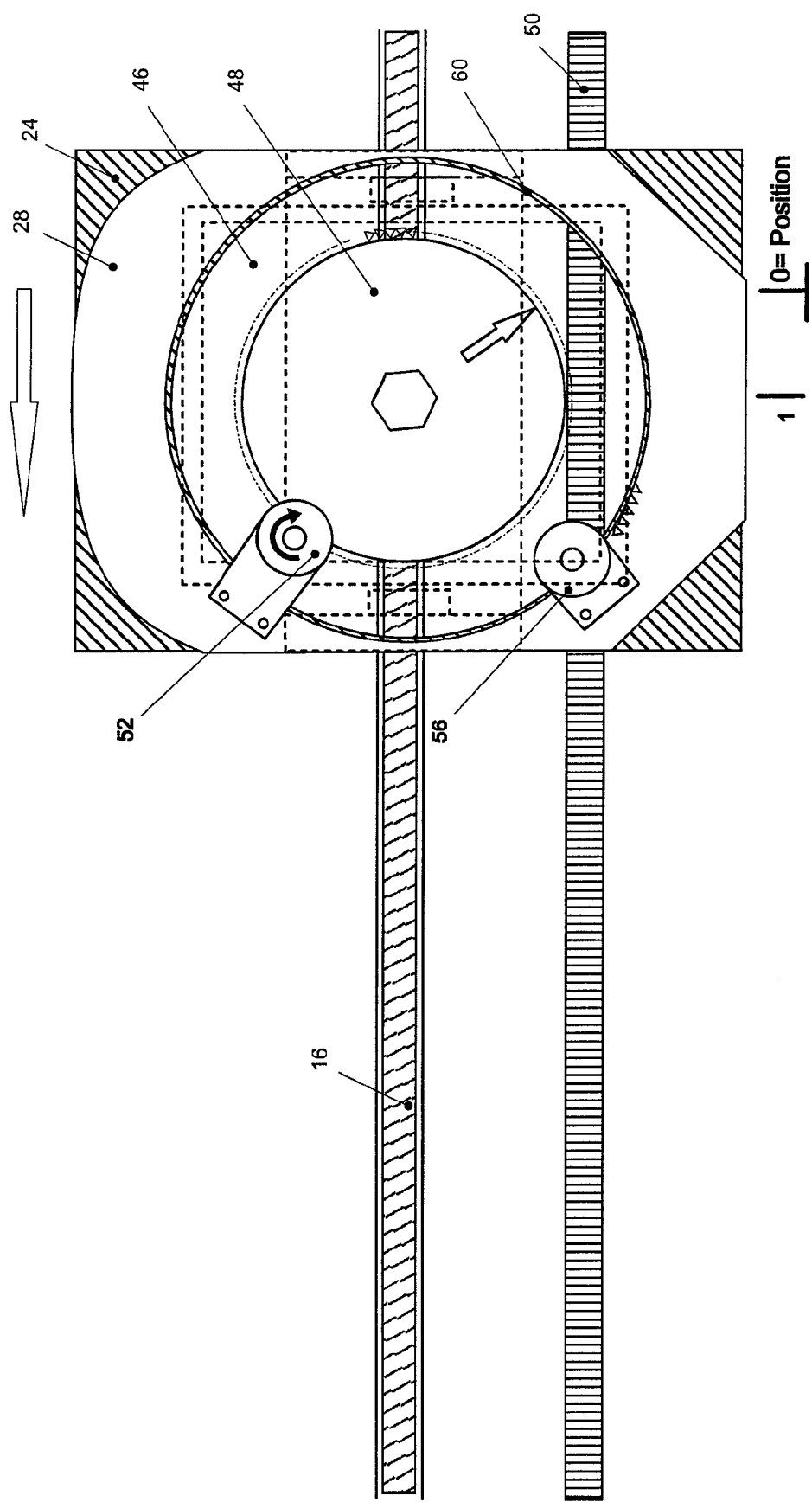

First, the robotic unit should be in a starting position (0-position), as is shown in FIG. 3. If the first motor 52 is driven, then it turns the pinion 54, e.g., clockwise, as is indicated in FIG. 4 by an arrow. The pinion 54 is in engagement with the outer toothing of the toothed wheel 48 so that it is turned counterclockwise, which can be seen at the white marking arrow. Since the toothed wheel 48, for its part, is in engagement with the toothed bar 50, the base plate 24, along with the entire robotic unit 14, moves to the left on the guide bar 16, as is shown in FIG. 4 by an arrow and the movement from the 0-position into the 1-position.

If the first motor 52 is driven in the opposite sense, i.e., counterclockwise, then the base plate 24, along with the robotic unit 14, accordingly moves on the guide bar 16 in the opposite direction, i.e., to the right in the drawing. Thus, through the controlled startup of the first motor 52, the robotic unit 14 can be traversed and positioned in the translational direction of the guide bar 16. Here, the second motor 56 remains out of operation.

Figure 5:
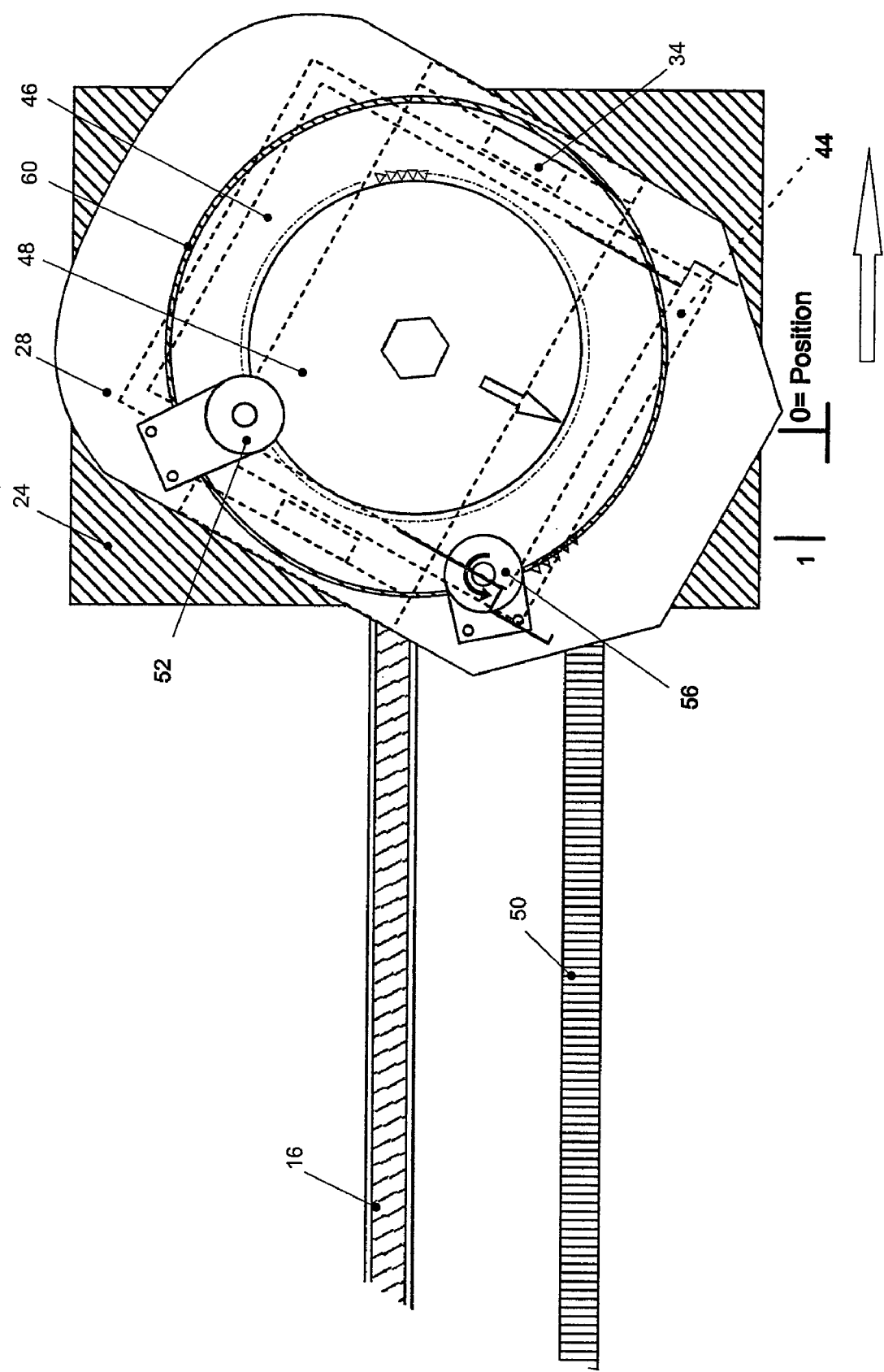

If, on the contrary, the second motor 56 is switched on, as FIG. 5 shows, then its pinion 58 is turned, e.g., counterclockwise, as is indicated in FIG. 5 by an arrow. Since the pinion 58 of the second motor 56 is in engagement with the inner toothing 60 of the base plate 24, and the guide bar 16 holds this base plate 24 in such a manner that it cannot turn, the pinion 58 runs in the inner toothing 60 of the recess 46 and the rotary plate 28 is turned clockwise with respect to the base plate 24. The first motor 52 is also fixed in the rotary plate 28 and its pinion 54 stands still since the first motor 52 is not in operation. The rotary plate 28 thus entrains, via the first motor 52 and its pinion 54, the toothed wheel 48 during the clockwise turning, as can be seen in FIG. 5 at the white marking arrow of the toothed wheel 48. The toothed wheel 48 thus runs on the toothed bar 50 and moves the base plate 24 to the right on the guide bar 16. If the second motor 56 is operated in the opposite sense, i.e., clockwise, then the rotary plate 28 accordingly moves counterclockwise and the base plate 24 is displaced to the left. Thus, if the second motor 56 is switched on by itself, then, as one effect, the rotary plate 28, along with the picker 18 disposed thereon, is turned and, as another effect, the base plate 24, along with the entire robotic unit 14, is displaced linearly on the guide bar 16. In so doing, however, the linear movement of the base plate 24 is necessarily coupled with the turning movement of the rotary plate 28.

Figure 6:
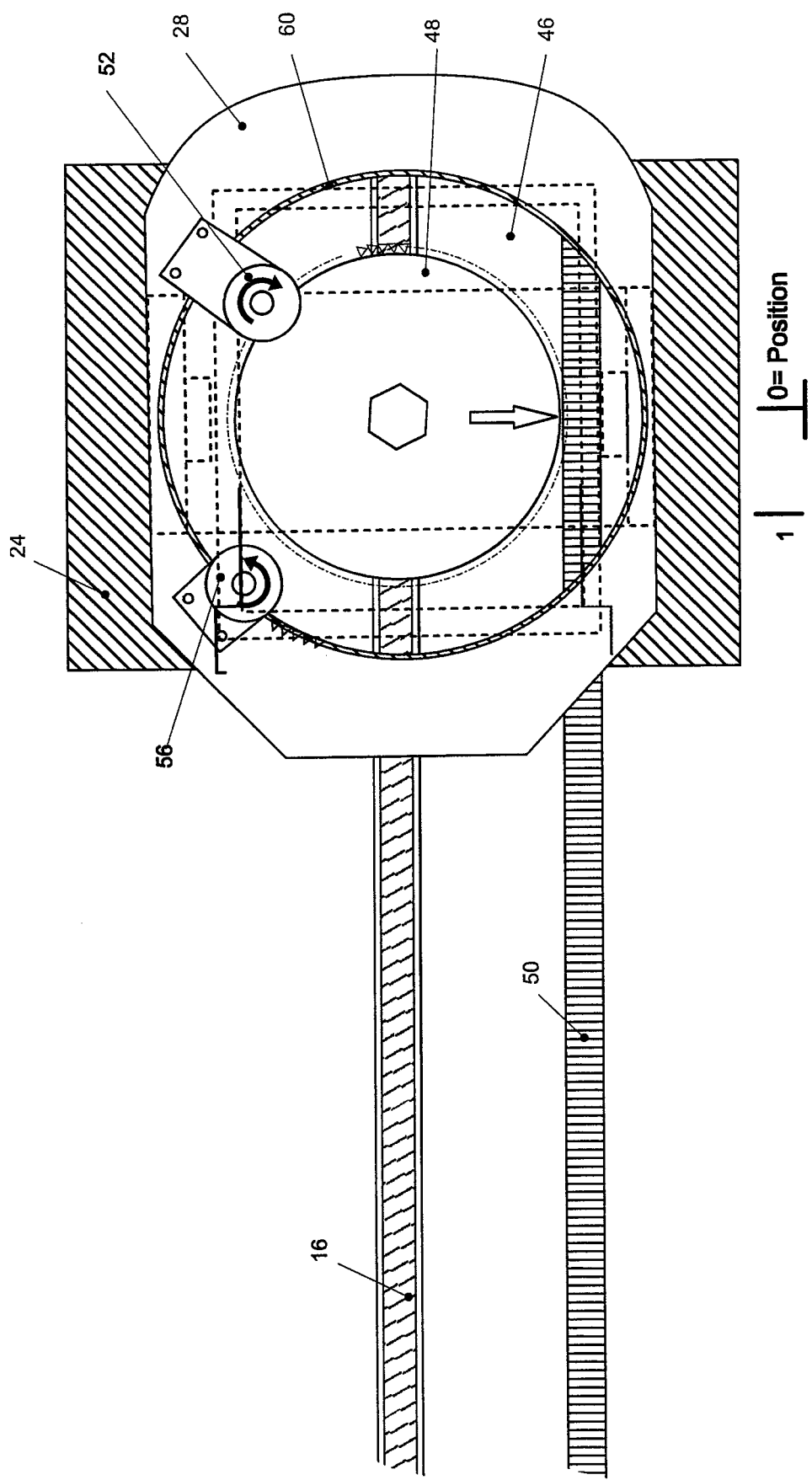

If both motors 52 and 56 are set in operation in a controlled manner, then the turning of the rotary plate 28, and with it the picker 18, about the vertical axis and the translational movement of the robotic unit 14 on the guide bar 16 are controlled independently of one another. This is represented by way of example in FIG. 6. There, the second motor 56 is driven counterclockwise in order to turn the rotary plate 28 with the picker 18 clockwise, as is the case in FIG. 5. In order to prevent a linear movement of the base plate 24 in this case, the first motor 52 is simultaneously driven clockwise so that via its pinion 54 it drives the toothed wheel 48 counterclockwise, whereby the turning of the toothed wheel 48 caused by the turning of the rotary plate is compensated. Thus, the toothed wheel 48 remains still during the turning of the rotary plate 28 and the base plate 24 remains in its position, as is represented in FIG. 6. It is thus possible to turn the picker 18 about the vertical axis of rotation while the entire robotic unit 14 remains in the same position in its translational path.

If the first motor 52 is driven at a different rotary speed, then the turning of the toothed wheel 48 caused by the first motor 52 is superimposed on the turning of the toothed wheel 48 due to the turning of the rotary plate 28 caused by the second motor 56. Thus, in addition to the turning of the rotary plate 28, and with it of the picker 18, a simultaneous linear advance of the base plate 24 on the guide bar 16 in both directions can be effected.

Thus, through a programmed control of the motors 52 and 56, the robotic unit 14 can be moved linearly without the picker 18 being turned; the picker 18 can be turned without the robotic unit 14 being moved linearly; finally, turning of the picker 18 in both turning directions can be combined simultaneously with a translational movement of the robotic unit 14 in both directions.

LIST OF REFERENCE NUMBERS

10 Housing
12 Magazines
14 Robotic unit
16 Guide bar
18 Picker
20 Functional units
22 Slots
24 Base plate
26 Rollers
28 Rotary plate
30 Swivel pin
32 Rollers
34 Frame
36 Motor
38 Gear mechanism
40 Pinion
42 Toothed track
44 Picker arm
46 Recess
48 Toothed wheel
50 Toothed bar
52 First motor
54 Pinion
56 Second motor
58 Pinion
60 Inner toothing

What is claimed is:

1. A device for handling data media in a storage device comprising:
   slots for the data media, wherein the openings of said slots are disposed in the storage device in at least two groups offset at an angle with respect to one another; and
   a robotic unit which can be traversed and positioned in front of the slots in order to remove the data media from the slots by means of a picker, to insert the data media into the slots, and to transport the data media between different slots;

wherein the robotic unit can be traversed by means of a toothed wheel driven by a first controllable motor and a toothed linear track along a translational path in a plane and can be turned by means of a second controllable motor engaging in a circular toothing about an axis of rotation perpendicular to the plane;

wherein the robotic unit comprises a base plate which can be displaced in a guided manner along the translational path;

wherein on the base plate a rotary plate is mounted in such a manner that it can turn about the axis of rotation perpendicular to the base plate;

wherein the rotary plate carries the picker;

wherein the base plate comprises, concentric to the axis of rotation, a recess within which a toothed wheel is accommodated which is mounted in such a manner that it can turn and is concentric with the axis of rotation;

wherein the first motor is disposed on the rotary plate and engages, by means of a pinion, in an outer toothing of the toothed wheel, wherein the outer toothing of the toothed wheel is in engagement with the toothed linear track;

wherein the second motor is disposed on the rotary plate and engages, by means of a pinion, in a circular toothing of the base plate; and wherein said circular toothing is concentric to the toothed wheel.

2. The device according to claim 1, wherein the recess of the base plate is formed to be circular and the circular toothing is formed as an inner toothing on the circumference of the recess.

3. The device according to claim 1, wherein the outer toothing of the toothed wheel and the inner toothing of the recess are in a common plane.

4. The device according to claim 1, wherein by driving only the first motor the robotic unit is moved translationally and by driving both the first motor and the second motor turning of the robotic unit about the axis of rotation can be combined with any translational movement of the robotic unit.

5. The device according to claim 1, wherein the rotary plate carries a picker which can be adjusted in its height.

6. The device according to claim 5, wherein the picker can be lowered to the rotary plate.

7. A device for handling data media in a storage device comprising:
slots for the data media, wherein the openings of said slots are disposed in the storage device in at least two groups offset at an angle with respect to one another;
a robotic unit comprising a base plate which can be displaced in a guided manner along a translational path;
a rotary plate carrying the picker and being mounted on the base plate in such a manner that it can turn about an axis of rotation perpendicular to the base plate which comprises, concentric to the axis of rotation, a recess within which a toothed wheel is accommodated which is mounted in such a manner that it can turn and is concentric with the axis of rotation;
a first motor disposed on the rotary plate which engages, by means of a first pinion, in an outer toothing of a toothed wheel, wherein the outer toothing of the toothed wheel is in engagement with a toothed linear track; and
a second motor disposed on the rotary plate which engages, by means of a second pinion, in a circular toothing of the base plate, wherein said circular toothing is concentric to the toothed wheel.

8. The device according to claim 7, wherein the recess of the base plate is formed to be circular and the circular toothing is formed as an inner toothing on the circumference of the recess.

9. The device according to claim 7, wherein the outer toothing of the toothed wheel and the inner toothing of the recess are in a common plane.

10. The device according to claim 7, wherein by driving only the first motor the robotic unit is moved translationally and by driving both the first motor and the second motor turning of the robotic unit about the axis of rotation can be combined with any translational movement of the robotic unit.

11. The device according to claim 7, wherein the rotary plate carries a picker which can be adjusted in it height.

12. The device according to claim 11, wherein the picker can be lowered to the rotary plate.

* * * * *